INVENTORS
HERBERT B. FERNALD
RUSSELL G. HAY
ALFRED N. KRESGE

United States Patent Office 3,510,539
Patented May 5, 1970

3,510,539
CONVERSION OF ETHYLENE TO ALPHA OLEFINS IN THE PRESENCE OF A SOLVENT
Herbert B. Fernald, Glenshaw, Russell G. Hay, Gibsonia, and Alfred N. Kresge, Verona, Pa., assignors to Gulf Research & Development Company, Pittsburgh, Pa., a corporation of Delaware
Filed Nov. 9, 1966, Ser. No. 593,038
Int. Cl. C07c 3/10
U.S. Cl. 260—683.15                4 Claims

ABSTRACT OF THE DISCLOSURE

A process for the production of alpha olefins from ethylene in the presence of trialkylaluminum catalyst and solvent in a tubular reactor immersed in a bath of heat exchange fluid wherein no catalyst and solvent are added to the ethylene until the ethylene is preheated to full reaction temperature in an upstream portion of the tubular reactor and the reaction then occurs at a constant temperature in a downstream portion of the tubular reactor.

---

Figure 1:
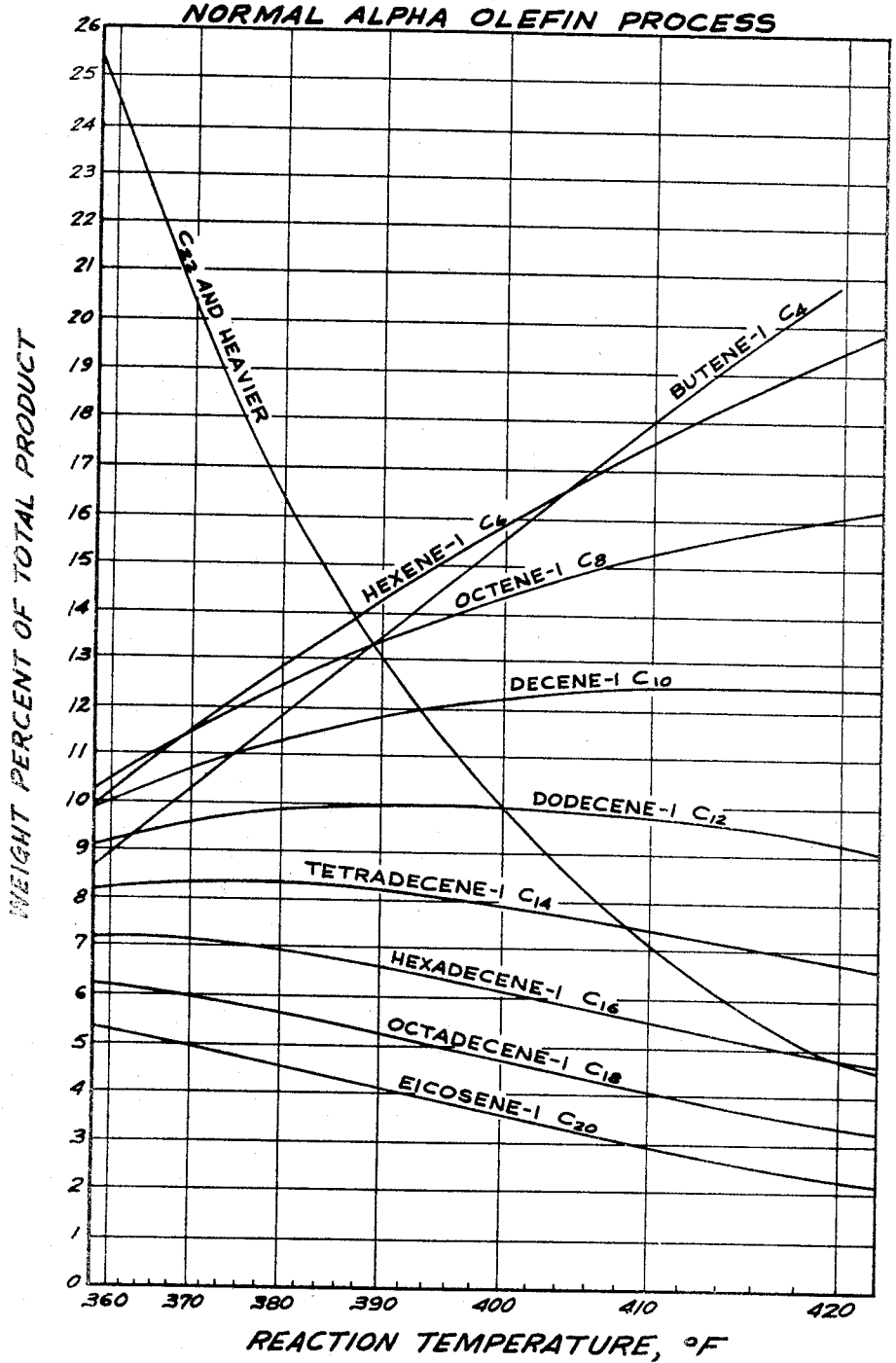

This invention relates to a process for the production of alpha olefins from preheated ethylene in the presence of a solvent. More particularly, this invention relates to a process for the production of alpha olefins from ethylene within a long tubular reactor with ethylene being charged to one end of the reactor coil and an organometallic catalyst dissolved in a solvent of this invention being charged to said coil at an intermediate position along the length thereof whereat said ethylene has been preheated.

The step-wise conversion of gaseous ethylene to higher straight chain normally liquid olefins having the double bond in the terminal or alpha position proceeds as follows:

$$CH_2=CH_2+CH_2=CH_2 \rightarrow CH_3-CH_2-CH=CH_2$$

$$CH_3-CH_2-CH=CH_2+CH_2=CH_2 \rightarrow$$
$$CH_3-CH_2-CH_2-CH_2-CH=CH_2$$

etc. This polymerization occurs catalytically in the presence of organometallic compounds, such as aluminum alkyls, which participate in the reaction. As the reaction proceeds in the presence of excess ethylene, an increasing quantity of gaseous ethylene is converted to liquid olefin so that the density of the reaction system progressively increases. The chemistry of the alpha olefin process can be described in terms of three major reactions. In the propagation (growth) reaction, an alkyl group on an aluminum atom containing $n$ ethylene units can add an ethylene molecule to become an alkyl group of $n+1$ ethylene units, as follows:

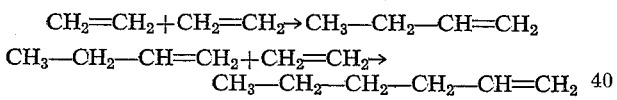

The transalkylation (displacement) reaction which occurs concurrently with the growth reaction consists of two steps. These are, first, thermal decomposition of an aluminum alkyl group to a hydride plus alpha olefin followed by a rapid reaction of the hydride with ethylene to regenerate an ethyl group which can start another growth cycle. The thermal decomposition is much slower than reaction of ethylene with a hydride and, therefore, is the rate-determining step for the over-all reaction.

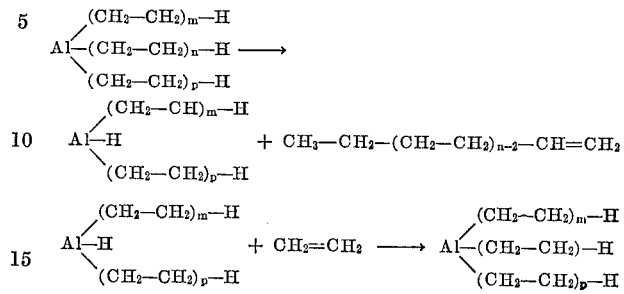

The growth and displacement reactions occur repeatedly as long as there is unreacted ethylene present. Therefore, the reaction is advantageously afforded a very high residence time. As long as there is free ethylene in the presence of catalyst in the reactor under reaction conditions, each mole of catalyst present will produce additional normal alpha-olefin product. Therefore, a long residence time is conducive to a high alpha-olefin yield per mole of catalyst, i.e., a high catalyst efficiency.

The third reaction is similar to the first except that the aluminum alkyl adds a product alpha olefin, rather than ethylene, to form a branched chain aluminum alkyl group. However, this structure is very unstable and rapidly decomposes to form a hydride and an olefin of vinylidene structure.

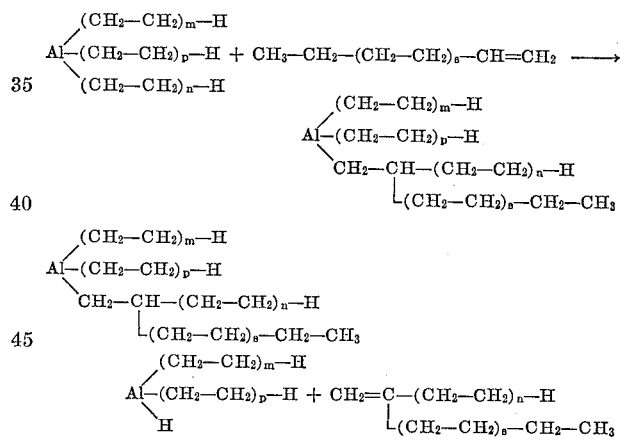

The decomposition is so rapid compared to the addition of another ethylene molecule to the branched alkyl that essentially all reactions of this type result in an olefin of vinylidene structure and regeneration of an aluminum ethyl alkyl group. As a result, there will be few, if any, alpha olefins with branching beyond the beta carbon.

Low temperature favors the growth reaction and will result in a higher average molecular weight product. At high temperatures, the average molecular weight will be lower because the transalkylation reaction predominates. The proportion of $C_{12}$ alpha olefin in the product tends to remain relatively constant with temperature changes within the most preferred range of this invention, with lower temperatures favoring a relatively higher proportion of product above $C_{12}$ and higher temperatures favoring a relatively higher proportion of product below $C_{12}$.

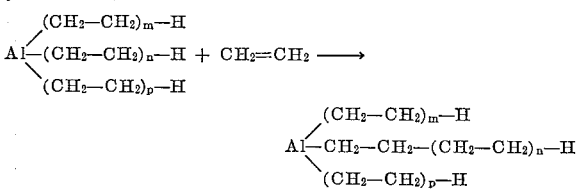

In view of the fact that the production of normal alpha olefins is the object of the above reactions, ethylene is the sole olefin which can be employed in the charge. The normal alpha olefins produced will have from four to about 40 carbon atoms and will be primarily liquid with practically no solid polymer produced except as an undesired by-product. The normal alpha olefins produced, particularly the $C_{12}$, $C_{14}$, $C_{16}$ alpha olefins, have high utility for the production of detergents.

The catalyst employed in the alpha olefin process can be defined by the following structural formula: $M'_a M_b R_c X_d$, wherein $M'$ is a metal selected from the alkali or alkaline earth metals and $a$ can be either 0 or one; $M$ is a metal selected from the group consisting of aluminum, gallium, indium and beryllium and $b$ can be either 0, one or two, except that $a+b$ is at least one; R is selected from the group consisting of monovalent saturated aliphatic or alicyclic radicals, monovalent aromatic radicals or any combination thereof; X is selected from the group consisting of hydrogen and halogen. The sum of $c$ and $d$ is equal to the total valences represented by the metals, and when X is a halogen $c$ must be at least one. Examples of catalysts which can be employed include $Be_2(H_5)_2$, $LiC_2H_5$, $AlH_3$, $HAl(CH_3)_2$, $Al(CH_3)_3$, $Al(C_2H_5)_3$, $Al(C_4H_9)_3$, $Al(C_3H_7)_3$, $Al(C_6H_5)_3$, $Ga(CH_3)_3$, $$Ga(C_2H_5)_3$$

$$In(C_2H_5)_3$$

$In(CH_3)_3$, $Be(C_6H_5)_2$, $Na(C_5H_{11})$, $Al(C_2H_5)_2Cl$, $$Al(C_2H_5)Cl_2$$

$Al(C_4H_9)_{1.5}Cl_{1.5}$, $Al(C_4H_9)_2Cl$, $LiAlH_4$, $NaAlH_4$, $$LiAl(C_2H_5)_4$$

$NaAl(C_4H_9)_4$, $Mg(AlH_4)_2$, $Zn(C_2H_5)_2$, etc. The catalyst can be used as such, but preferably is dispersed in an inert hydrocarbon solvent as described below. Since it is desired to produce a liquid alpha-olefin product rather than a relatively high molecular weight solid polymer, the catalyst defined above should be substantially free of catalyst components, such as, for example, $TiCl_4$, which tend to cause production of relatively high molecular weight solid polymers. The amount of catalyst required herein is not critical and can be from about $1 \times 10^{-4}$ to about $1 \times 10^{-2}$ moles per mole of ethylene.

The temperature of the reaction can range from about 285° F. to about 615° F., generally, from about 350° F. to about 430° F., preferably, and from about 380° F. to about 400° F., most preferably. The upper range of pressure employed is not critical and can be as high as about 1000 atmospheres or even higher, but the lower pressure range, however, is critical. The pressure should be sufficiently high that most of the alpha-olefin product is a liquid under reaction conditions and so that the catalyst and most of the ethylene are dissolved or dispersed in said liquid. It is important to have as high as possible a concentration of ethylene in the phase containing the catalyst, otherwise olefin product rather than ethylene will tend to react with the catalyst to produce vinylidenes. Therefore, the pressure should be sufficiently high to force as much ethylene as possible into the liquid phase together with the catalyst. After there has been a conversion of 55 to 60 percent of the ethylene, there is sufficient liquid product to dissolve substantially all the ethylene and produce a single homogeneous phase in the reactor. Thus, the pressure in the reactor must at all times be at least about 500, and preferably at least about 2000 pounds per square inch gauge.

When it is desired to terminate the reaction, the product is withdrawn from the tubular reactor and is reduced in temperature and pressure, whereupon most of the gaseous olefins are flashed off. The liquid product is then treated in any suitable manner to deactivate the catalyst and the desired product fractions are recovered. The catalyst may be deactivated, for example, by contact with sufficient acid, base water or alcohol to react stoichiometrically with the catalyst. When an acid or base is employed an aqueous layer is formed, which is then separated from the organic layer, and the remainder, including the solvent for the catalyst, can be separated into its component parts by distillation. If desired, the catalyst can be deactivated by contact with oxygen or halogens or any other material which reacts with and suitably destroys the catalytic activity of organometallic compounds. In a preferred method the aluminum catalyst is removed from the alpha-olefin product by reaction with caustic solution to form $Na_2OAl_2O_3$ plus paraffin as follows:

$$2H_2O + 2NaOH + 2AlR_3 \rightarrow NaOAl_2O_3 + 6 \text{ paraffin.}$$

It is shown in Ser. No. 153,815, filed Nov. 21, 1961, now abandoned, that the amount of the desired normal alpha olefin in the product is always greater when the polymerization reaction is carried out in a tubular or coil reactor rather than in a single continuous stirred autoclave or series of stirred autoclaves for a given total conversion of ethylene to some kind of polymer. That application explains that in order to achieve high selectivity toward normal alpha olefins the reactants and product should flow substantially as column through the tube whereby there is a minimum of backmixing so that the percentage of normal alpha-olefin product increases throughout the length of the reactor. Since a given molecule of aluminum alkyl catalyst can undergo growth and transalkylation reactions repeatedly, it is important that ethylene charge and catalyst be permitted a high residence time in order to achieve a high catalyst efficiency, i.e., the production of a large amount of normal alpha olefins per mole of aluminum alkyl catalyst charged. A high residence time and avoidance of backmixing is most conveniently achieved by utilizing a very long tubular reactor.

Temperature control is an important consideration in a very long tubular reactor. The molecular weight distribution of the normal alpha-olefin product, in addition to rate of conversion, is determined by the temperature of the reaction and it is therefore important to maintain substantially a constant temperature at every point along the length of the reactor tube. If the tube length is very great, it is apparent that concurrent or counter-current flow of a coolant along the length of the tube on the outside thereof will produce a temperature gradient in the cooling fluid and, therefore, also in the reactor tube. To overcome this disadvantage, the reactor tubes are advantageously submerged in a bath of a pressurized boiling liquid, such as water, whereby a constant temperature is maintained throughout the entire body of cooling fluid. A change in the pressure exerted on the boiling liquid produces a rapid change in temperature at every point throughout the liquid bath, especially because of the agitation provided in the bath because of the boiling of the coolant.

In accordance with this invention, the reaction is performed in the presence of an inert, unreactive hydrocarbon solvent such as paraffins, olefins, naphthenes or alkyl aromatics having 18, 20 or more carbon atoms, or a recycle stream comprising the $C_{18}$ or $C_{20}$ and higher alpha-olefin product of the process. The components in the alpha-olefin product can have as many as about 40 carbon atoms, but more usually contain only a small proportion of components above about 28 or 30 carbon atoms. An advantageous solvent of this invention can comprise a $C_{18}$ or $C_{20}$ and higher alpha-olefin stream, such as a recycle stream comprising mostly or entirely $C_{20}$ to $C_{28}$ alpha olefins. A solvent stream comprising other saturated or unsaturated, branched or unbranched hydrocarbons within the molecular weight range of this invention can also be used.

The solvent exerts its beneficial effect upon the process in the initial stages of the reaction, i.e., near the zone of the reactor tube whereat ethylene and catalyst are first contacted with each other, and after the reaction proceeds to a significant extent the product itself assumes the solvent function and eventually far exceeds in quantity the initially added solvent. Catalyst which is continuously added to the reactor is advantageously dissolved in the solvent in any suitable concentration range, such as between about 0.5 and 50 percent by weight, generally, and between about 2 and 15 percent by weight preferably. The concentration of catalyst in the solvent will depend upon both the quantity of solvent desired in the system and upon the desired ratio of catalyst to ethylene charge.

Upon addition of the catalyst and solvent to the ethylene charge in the reactor, substantially all the catalyst remains dissolved in the solvent. In order to encourage the production of normal alpha olefins in the reactor it is important that as much as possible of the gaseous ethylene reactant be rapidly dissolved in the phase containing the catalyst, i.e., the liquid solvent phase. Under the temperature and pressure conditions of the reactor a substantial quantity of ethylene is almost immediately dissolved in the liquid solvent phase enabling the reaction to proceed readily. As normal alpha-olefin product is produced, this product in turn is available as a solvent and as the reaction proceeds the product produced in the reactor becomes dominant in quantity.

It is a critical feature of this invention that the catalyst and solvent not be added to the tubular reactor together with the ethylene, which is relatively cold, but rather that the ethylene charge be added separately to the inlet end of a tubular reactor immersed in a heat exchange medium so that said cold ethylene becomes preheated nearly to full reactor temperature before catalyst and solvent is added. The catalyst and solvent are then injected into the tubular reactor at the downstream position closest to the inlet end of the reactor whereat the temperature of the ethylene has just about reached the reaction temperature. If the catalyst and solvent were added to the reactor together with the ethylene, contrary to this invention, the solvent would encourage a high reaction rate at a relatively cold temperature which is below the control reaction temperature because of the presence of non-preheated ethylene. Moreover, the solvent itself helps to dissipate the heat of the reaction. Increasing the rate of the reaction at a temperature below the desired reaction temperature would be severely disadvantageous because the temperature of the reaction determines the carbon number distribution in the normal alpha-olefin product and relatively low reaction temperatures encourage production of undesirable components of the product. The carbon number of the product components is a highly important consideration because the $C_{12}$, $C_{14}$, and $C_{16}$ alpha olefins are the most desirable components of the product, being useful for the production of detergents, while the $C_{22}$ and higher molecular weight alpha olefins are the least desirable components of the product. FIG. 1 shows how the carbon number distribution of the alpha-olefin product of the process of this invention varies with temperature. FIG. 1 clearly shows the predominance of $C_{22+}$ product at low reaction temperatures.

It is apparent that if the catalyst and solvent were added to cold ethylene, the sole contribution of the solvent would be to enhance the efficiency of the reactor for the production of an undesirable product. Therefore, if catalyst were added directly to cold ethylene, it would be more advantageous to omit use of a solvent of the present invention. On the other hand, if the ethylene is added separately to one end of the reactor tube and permitted to become preheated prior to addition of catalyst and solvent which are introduced at a downstream position in the reactor coil whereat the ethylene has been just about preheated to reaction temperature, the solvent will function to enhance the efficiency of the reactor for the production of the most desirable alpha-olefin products of the process.

Generally, in accordance with the present invention the process does not produce substantially any solid alpha-olefin porduct having a molecular weight higher than the components of the solvent, except for a relatively small amount of undesired solid polymer which tends to foul walls of the reactor tubes. In the process of the present invention wherein a liquid rather than a solid product is produced, the solvent functions by increasing the initial rate of production of preferred alpha olefins, i.e., in furthering the reaction during its early stages before a quantity of alpha-olefin product has been produced substantially equal to the quantity of solvent added with the catalyst. This function of the solvent is sharply contrasted to the function of a solvent in processes which use organometallic catalyst together with cocatalysts such as $TiCl_4$ to produce a product having a much higher molecular weight than the product of the present process and which are solid rather than liquid, i.e., have a molecular weight from about 2,000 to 1,000,000 or 2,000,000. The primary function of a solvent in such processes is to form a slurry with the solid polymer product and to facilitate its removal from the reactor. In performing this function the solvent exerts its primary effect after the product is produced, rather than before production of any substantial amount of product as is the case in the method of the present invention.

In the production of high molecular weight solid polymers, a relatively large quantity of solvent is required to form a slurry of the solid product. In contrast, it is a critical feature of the present invention that only a relatively small amount of solvent be employed. In the performance of the present invention in a tubular reactor, as described above, a highly beneficial effects is achieved when a small quantity of solvent is employed while an increase in the quantity of solvent utilized above the critical value of this invention causes the solvent to actually exert a detrimental effect upon the process. The presence of a relatively small amount of solvent, said amount being within the range of the present invention, encourages formation of a homogeneous liquid phase containing substantially all the catalyst and a substantial quantity of dissolved ethylene in which the reaction can proceed. As liquid product is formed it is miscible with and is incorporated into the homogeneous liquid phase, providing an enlarged liquid phase into which still more ethylene can dissolve to be in close proximity to the catalyst and thereby participate in the reaction.

The reason that a relatively small quantity of solvent should be employed is to enable the solvent to assist in initiating the reaction without consuming an excessive amount of reactor volume to excessively reduce the residence time of catalyst and ethylene in the reactor. As noted above, each molecule of organo-metallic catalyst reacts repeatedly with unreacted ethylene as long as said catalyst remains in the reactor. If the amount of solvent employed is increased above the range of this invention, it consumes an excess amount of reactor volume causing residence time to decrease excessively. An excessive decrease in residence time limits the extent of the reaction and thereby negates any advantage otherwise achievable by the use of a solvent.

When a solvent of this invention is added to the reactor in small quantities, an increase in reactor efficiency begins to appear. As the amount of solvent is increased, the increase in reactor efficiency continues until a maximum is achieved. Thereupon, use of a quantity of solvent above the range of this invention imparts a decrease in reactor efficiency, because loss of residence time within the reactor becomes the controlling feature. Therefore, it is critical that the amount of solvent employed is not more than about 50 percent by weight of the total charge to the process, and that the amount of solvent in the total charge is between about 0.1 and 25 percent by weight, generally, and between about 2 and 15 percent by weight, preferably.

It is not merely the quantity of solvent added which is a critical consideration in holding the adverse effect of the solvent upon residence time within permissible limits, but also the composition of the solvent. In fact, the composition of the solvent can be a much more important consideration in this regard. For example, the solvent should not contain significant quantities of any component which will vaporize to any appreciable extent under the temperature and pressure conditions of the reactor. A gaseous component in the reactor, other than ethylene, not only will not contribute to the desired effect of the solvent but also will impart a much more serious diminution of residence time than the presence of the same number of moles of a liquid because of the much greater volume occupied by a material in the gaseoaus state. In order to substantially completely avoid the presence of components in the solvent which will vaporize to a significant extent in the reactor it is advantageous to employ a solvent which is comprised nearly entirely of components whose critical temperature is above reactor temperature and whose critical pressure is below reactor pressure, said solvent being substantially free of significant quantities of components whose critical temperature and pressure do not meet these requirements.

Because of critical temperature and pressure considerations, the molecular weight range of the solvent materials of this invention is critical. Low molecular weight hydrocarbons have a very low critical temperature and a very high critical pressure. Relatively high molecular weight hydrocarbons possess a much higher critical temperature and a much lower critical pressure. Therefore, the present invention comprises the use of inert paraffins, olefins, naphthenes and alkyl aromatics having at least $C_{18}$ or $C_{20}$ carbon atoms which are in the liquid phase under reaction conditions. The upper molecular weight limit is primarily based upon practical considerations of solvent handling. For example, the molecular weight of the solvent component should not be so high that the solvent cannot be kept in a fluid condition at temperatures under about 180° F. As stated, the solvent should have solubility characteristics such that in the reactor the alpha olefin liquid product is miscible with it and so that the ethylene charge is soluble in it.

A series of tests were performed to show the advantageous effect of the solvents of this invention and to illustrate the criticality of the molecular weight of the solvent material. These tests were performed in a coil immersed in pressurized boiling water, said coil having a length of 75 feet and in inside diameter of 0.215 inch. Ethylene was the reactant and aluminum triethyl was the catalyst. The catalyst was introduced to the reactor in solution in the solvent material. The solvent material comprised about 10 to 12 weight percent of the charge stream. The various solvents used for testing included normal heptane, normal hexadecene-1, and the range of normal $C_{20}$ and higher olefins produced by the process. The results of the tests are shown in the following table.

ever, the use of $C_{20+}$ alpha olefins as a solvent imparted a very substantial increase in reactor efficiency as compared to the use of both normal heptane and hexadecene-1.

Figure 2:
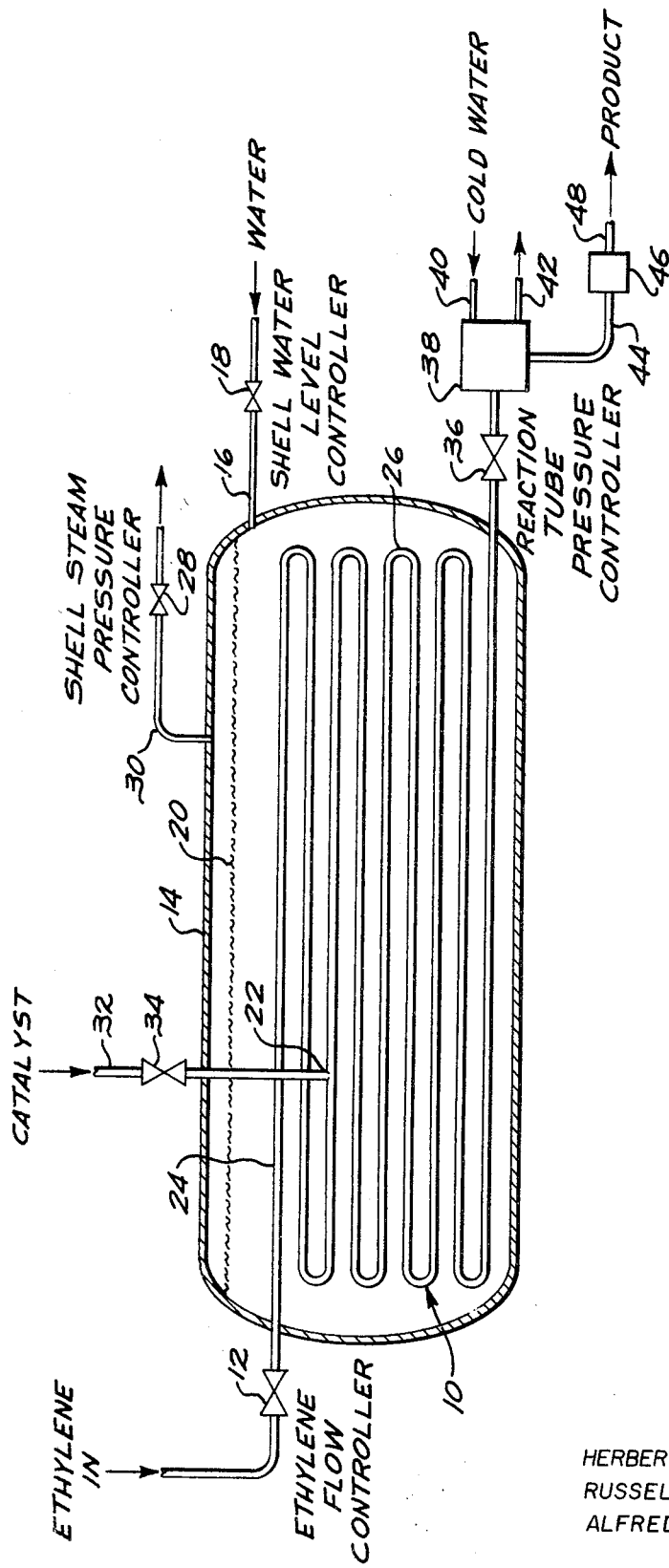

FIG. 2 shows a tubular reactor system for the practice of this invention wherein ethylene is charged to a very long tubular reactor 10 through a flow control valve 12. Tubular reactor 10 is disposed substantially entirely within outer shell 14. Cooling water is charged to shell 14 through line 16. Level control valve 18 maintains a constant water level 20 within the shell which completely submerges reactor 10. A relatively small stream of alkylaluminum catalyst, such as triethylaluminum, dissolved in a solvent of this invention is pumped by positive displacement action to an intermediate point 22 in coil 10 through line 32 and valve 34 so that the region 24 of said coil upstream from point 22 serves as an ethylene preheat zone and the region 26 of said coil downstream from point 22 serves as a reaction zone. Point 22 is essentially the point in said reactor coil closest to the inlet end wherein the ethylene is substantially effectively preheated to the reaction temperature. Thereafter, regulation of steam pressure within shell 14 by means of steam pressure control valve 28 in line 30 establishes the temperature of the boiling water throughout shell 14 and maintains a uniform reactor temperature substantially throughout the length of reaction zone 26 of the coil 10. Reaction zone effluent comprising predominantly normal alpha olefins, unreacted ethylene, catalyst, and catalyst solvent is discharged through reactor pressure control valve 36, whereat the pressure is reduced to between about 50 and 1,000 pounds per square inch gauge, and is then discharged through cooling chamber 38 whereat product temperature is reduced to the lowest practical temperature while still maintaining the product in a liquid state, i.e., to about 150° F., by means of water charged through line 40 and removed through line 42. Finally, product which is cooled and at a reduced pressure is passed through line 44 and a product measuring device 46, such as a flow recorder or chromatograph, depending upon the type of measurement desired for the process, and is then discharged through line 48 to a caustic treatment chamber, not shown, for removing the catalyst from the desired normal alpha-olefin product by reacting the catalyst with caustic to produce sodium aluminate and paraffins.

In order to achieve the highest conversion of ethylene to normal alpha olefin per mole of catalyst used the length of the reactor is made as long as possible and is only limited by practical and economic size restrictions of outer shell 14, and by pressure drop. For example, tube 10 can comprise between about 500 and 10,000 feet of about one- to four-inch pipe. There are a number of reasons for utilizing a very long tubular reactor. First, a very long tubular reactor permits excellent heat transfer for removal of heat of reaction. Secondly, it advantageously reduces backmix-

| Temp., °F. | Pressure, pounds per square inch gauge | Catalyst solution | Conversion percent | Catalyst efficiency, grams ethylene converted per gram of triethylaluminum catalyst | Reactor efficiency, grams ethylene converted per hour per milliliter of reactor volume per weight fraction of catalyst in reactor feed |
|---|---|---|---|---|---|
| 395 | 4,000 | 11.0 percent triethylaluminum in normal heptane. | 84.2 | 44.7 | 71.5 |
| 395 | 4,000 | 11.9 percent triethylaluminum in normal heptane. | 85.0 | 47.3 | 66.3 |
| 395 | 4,000 | 12 percent triethylaluminum in $C_{16}$ normal alpha olefin. | 88.0 | 45.0 | 75.5 |
| 395 | 4,000 | 12 percent triethylaluminum in the $C_{20+}$ alpha olefins from the process. | 87.0 | 51.3 | 97.5 |
| 395 | 4,000 | ____do____ | 77.5 | 49.2 | 109.5 |
| 395 | 4,000 | ____do____ | 83.0 | 50.2 | 106.5 |

As shown in the above table, the use of hexadecene-1 as a solvent imparted only a moderate increase in reactor efficiency as compared to the use of normal heptane. Howing for the reason explained above. Thirdly, a long reactor length permits achievement of a high catalyst efficiency because of additional conversion per mole of catalyst.

Finally, a long reactor length tends to minimize the percentage of paraffin in the alpha-olefin product. The final reason is based upon the fact that upon separation of the alkyl aluminum catalyst by treatment with caustic the alkyl components of the catalyst are converted to paraffins which have boiling points close to those of the most desired alpha-olefin components of the product and are therefore difficult to remove from the desired normal alpha olefins. Since the absolute amount of paraffins produced is fixed by the quantity of catalyst used, the greater the quantity of alpha olefins produced with said catalyst the smaller will be the percentage of paraffins in the product.

The steam pressure in shell 14 is maintained at about between 50 and 500 pounds per square inch, generally, and at about between 140 and 340 pounds per square inch, preferably. The reactants in reaction zone 26 are generally at a temperature only about 3° F. to 25° F. above the bath temperature. The reaction temperature not only affects the degree of conversion of ethylene but it also establishes the molecular weight distribution of the alpha-olefin product. Since relatively low reaction temperatures favor conversion to relatively high molecular weight product it is important to preheat the ethylene to within about 1° F. to 30° F., generally, and 3° F. to 10° F., preferably, of the coolant bath temperature prior to addition of catalyst and solvent. It is believed that the relatively high molecular weight alpha olefins produced at low reaction temperatures grow into polymers which can foul the downstream region of the reactor tube and thereby increase the frequency of periodic reactor down times due to fouling because of polymer formation. It is therefore important not to add catalyst and solvent to the reactor tube until the ethylene has been preheated to as near as possible to reaction temperature, and preferably at least to within about 10° F. of reaction temperature.

Finally, the reactor tube should not be so long that more than about 75 weight percent, generally, or more than about 60 weight percent, preferably, of the ethylene is converted to product. The reason is that at high conversion levels, there arises excessive competition between olefin product and ethylene in the growth reaction, whereby conversion to vinylidene compounds becomes excessive.

Various changes and modifications can be made without departing from the spirit of this invention or the scope thereof as defined in the following claims.

We claim:
1. A catalytic process for the production of normally liquid alpha olefins having between about 4 and 40 carbon atoms from ethylene under reaction pressure and a reaction temperature of 350 to 430° F. comprising charging ethylene to one end of an elongated tubular reactor immersed in a bath of heat exchange fluid which acts as both an ethylene preheat fluid and a reaction coolant fluid, said fluid preheating the ethylene to reaction temperature, charging aluminum alkyl catalyst and a solvent substantially without catalyst components which tend to cause production of solid polymers to said tubular reactor at an intermediate position therein at which said ethylene is preheated to reaction temperature, no catalyst and solvent being added to said ethylene until said ethylene is preheated to reaction temperature, said solvent comprising hydrocarbon material having at least 18 carbon atoms and substantially free of materials which vaporize to a substantial extent under reaction conditions to provide a liquid phase in which ethylene and catalyst are first contacted with each other in initiating the reaction, the amount of said solvent in the reactor charge being between about 0.1 and 50 percent by weight, the portion of the tubular reactor downstream from said intermediate position being the reaction zone and said bath maintaining a substantially constant temperature throughout the length of said reaction zone.

2. The process of claim 1 wherein said solvent is a $C_{18+}$ recycle stream of said process.

3. The process of claim 1 wherein said solvent comprises a $C_{22}$ to $C_{28}$ alpha olefin recycle stream of said process.

4. The process of claim 1 wherein the catalyst is triethylaluminum.

References Cited

UNITED STATES PATENTS

| | | |
|---|---|---|
| 3,160,672 | 12/1964 | Pearson et al. |
| 3,227,773 | 1/1966 | Roming. |
| 3,310,600 | 3/1967 | Ziegler et al. |
| 3,358,050 | 12/1967 | Acciarri et al. |

PAUL M. COUGHLAN, JR., Primary Examiner